US009151822B2

(12) United States Patent
Waite et al.

(10) Patent No.: US 9,151,822 B2
(45) Date of Patent: Oct. 6, 2015

(54) PRECISE POSITIONING USING A DISTRIBUTED SENSOR NETWORK

(75) Inventors: James W. Waite, Los Gatos, CA (US); Thorkell Gudmundsson, San Jose, CA (US); Dimitar Gargov, Merced, CA (US)

(73) Assignee: Optimal Ranging, Inc., Santa Clara, CA (US)

( * ) Notice: Subject to any disclaimer, the term of this patent is extended or adjusted under 35 U.S.C. 154(b) by 0 days.

(21) Appl. No.: 12/982,723

(22) Filed: Dec. 30, 2010

(65) Prior Publication Data

US 2011/0156957 A1     Jun. 30, 2011

Related U.S. Application Data

(60) Provisional application No. 61/291,602, filed on Dec. 31, 2009.

(51) Int. Cl.
 *G01S 3/02*    (2006.01)
 *G01S 5/02*    (2010.01)
 *G01V 3/08*    (2006.01)

(52) U.S. Cl.
 CPC ............. *G01S 5/0252* (2013.01); *G01S 5/0221* (2013.01); *G01S 5/0226* (2013.01); *G01S 5/0247* (2013.01); *G01V 3/081* (2013.01)

(58) Field of Classification Search
 CPC ... G01S 5/0252; G01S 5/0221; G01S 5/0226; G01S 5/0247; G01V 3/081
 USPC .......................................................... 342/450
 See application file for complete search history.

(56) References Cited

U.S. PATENT DOCUMENTS

| | | | |
|---|---|---|---|
| 6,065,219 A * | 5/2000 | Murphey et al. ................. | 33/544 |
| 6,407,550 B1 | 6/2002 | Parakulam | |
| 6,493,649 B1 | 12/2002 | Jones et al. | |
| 6,895,333 B2 | 5/2005 | Hethuin et al. | |
| 7,057,383 B2 | 6/2006 | Schlapp et al. | |
| 7,062,414 B2 | 6/2006 | Waite et al. | |
| 7,120,564 B2 | 10/2006 | Pacey | |
| 7,356,421 B2 | 4/2008 | Gudmundsson et al. | |
| 7,443,154 B1 * | 10/2008 | Merewether et al. ........... | 324/67 |
| 2004/0100263 A1 | 5/2004 | Fannini et al. | |

(Continued)

OTHER PUBLICATIONS

ISR and Written Opinion for related PCT Application No. PCT/US2010/062608, dated Mar. 10, 2011.

(Continued)

*Primary Examiner* — Frank J McGue
(74) *Attorney, Agent, or Firm* — Haynes and Boone, LLP

(57) ABSTRACT

A method for determining the location and orientation of a transmitter object by measuring a set of complex electromagnetic field magnitude and phase strengths within a space using one or more receivers is provided. The method includes modeling a set of expected complex electromagnetic strengths to estimated position and orientation of the transmitter object. And estimating parameters related to the transmitter object position based on the residual error between the measured set of complex electromagnetic field values and a set of expected electromagnetic field values. Further embodiments include a method as above including a plurality of receivers with known positions within a limited space including the transmitter object. A sensor network including a plurality of receivers to perform the above method is also provided. The receivers may communicate using a wireless channel.

20 Claims, 10 Drawing Sheets

(56) References Cited

U.S. PATENT DOCUMENTS

2005/0077085 A1\* 4/2005 Zeller et al. .................... 175/45
2006/0055584 A1\* 3/2006 Waite et al. .................... 342/22
2007/0299623 A1\* 12/2007 Gandelsman et al. ......... 702/95
2009/0128156 A1 5/2009 Li et al.
2010/0141261 A1\* 6/2010 Overby et al. ................ 324/329

OTHER PUBLICATIONS

International Preliminary Report on Patentability and the Written Opinion mailed Jul. 11, 2013, in related International Application No. PCT/US2010/062608.

\* cited by examiner

PRECISE POSITIONING USING A DISTRIBUTED SENSOR NETWORK

RELATED APPLICATIONS

This application claims priority to Provisional Application No. 61/291,602, entitled "Precise Positioning in a Multiple Dipole Field," by James W. Waite, Kun Li, Johan Overby, Dimitar Gargov, Philip Desjardins, and Thorkell Gudmundsson, filed on Dec. 31, 2009, the contents of which are hereby incorporated by reference in their entirety.

BACKGROUND

1. Field of the Invention

Some embodiments of this invention relate to the field of precise location of concealed objects and linear utility conveyances, and, in particular, to precise positioning using a distributed sensor network.

2. Discussion of Related Art

Precise positioning, locating, and tracking of underground infrastructure is difficult under many circumstances, especially in dense urban environments, where buried or obscured pipes and other utilities are co-located in conduits within constrained rights-of-way. In those areas, active dipole transmitters, sometimes known as 'sondes,' may be used to track the path of an underground conduit, or the path of an underground directional drilling tool during the placement of new utility lines. Similarly, active signals are placed on linear utility conveyances (cables and pipes), to facilitate precise location of specific lines from a signal often distorted with similar signals from non-targeted lines.

Conventional precise location systems use a variety of methods to compute the position of a line or sonde-transmitter. Most often, the line is energized by a transmitter at a point away from the locate region of interest, where the line is accessible. In the case of a sonde, the device itself is a battery-operated active transmitter and is placed, towed, drilled, or pushed to the locate region of interest. A precise location receiver monitors the signal transmitted by the transmitter and derives an estimate of the offset, depth, and range to the targeted line or sonde.

Some precise location systems, known as real-time locating systems (RTLS) use ultra-wideband (UWB) technology if the entire system is aboveground and not significantly impacted by metal obstructions in the signal path. For UWB locating systems, short wavelength radio frequency (RF) pulses in the GHz range are used to measure time delay estimates from a transmitter source to each receiver, from which distance is determined using the known speed of propagation, i.e., the speed of light. Alternatively, path loss measurements from which distance can be inferred through a known exponential reduction in the omni-directional electric-field signal strength with distance, as long as the transmitter power is known. Lower frequency ranges are used for signal strength measurements, but poor accuracy results for situations when there are obstructions in the signal path between transmitter and receiver. WiFi-based RTLS are a typical example of signal strength-based aboveground locating systems that employ multiple distributed receivers. In either type of RTLS system, these measurements are used as input to a multi-lateration positioning algorithm to compute the location of the transmitter(s).

For underground and underwater precise location problems, the RF transmitter frequency must be constrained to less than 100 kHz to avoid high path loss. Since the detection range is from anywhere between a meter to a few tens of meters, sensors that detect magnetic fields are preferred, since at low frequencies the magnetic field can be closely controlled at the point of transmission by maintaining a fixed current flow through an underground linear conveyance, such as a cable or pipeline, or a point source, such as a dipole antenna. With a fixed current, the emitted AC magnetic field strength is stable and can be characterized by physical models. Point sources, like sonde transmitters, follow a dipole field model with $1/r^3$ decay with distance, while linear conveyances follow a cylindrical model with $1/r$ field strength decay with distance.

Therefore, there is a need for better, more precise, locating equipment.

SUMMARY

According to embodiments disclosed herein, a method for determining the location and orientation of a transmitter object may include the steps of measuring a set of complex electromagnetic field strength magnitude and phase values within a space using one or more receivers. The method may further include modeling a set of expected complex electromagnetic strengths at the currently estimated position and orientation of the transmitter object, the set of expected electromagnetic field values corresponding to a model of the transmitter object position in relation to the one or more receivers. The method may also include estimating parameters related to the transmitter object position based on the residual error between the measured set of complex electromagnetic field values and the set of expected electromagnetic field values.

Further embodiments disclosed herein include a method for determining the location and orientation of a transmitter object by providing a plurality of receivers within a limited space comprising the transmitter object, providing the position of each of the receivers, and measuring a set of complex electromagnetic field magnitude and phase strengths with at least one of the plurality of receivers. The method may further include modeling a set of expected complex electromagnetic strengths at the currently estimated position and orientation of the transmitter object, the set of expected electromagnetic field values corresponding to a model of the transmitter object position in relation to the one or more receivers. The method may also include estimating parameters related to the transmitter object position based on the residual error between the measured set of complex electromagnetic field values and the set of expected electromagnetic field values.

According to embodiments disclosed herein, a sensor network may include a controller and receivers, the receivers including coil detectors to receive RF signals from an RF source and the coil detectors for each receiver having mutually orthogonal axes. The sensor network may further include receivers that provide information to the controller to locate the source of the RF signals. Further, in some embodiments the receivers may communicate with the controller using a wireless channel and optionally with each other; and the controller has information of the location of the receivers.

Further according to embodiments disclosed herein, a receiver to detect RF signals produced by an RF source at a remote location may include a structural member having a finite length and two sets of mutually orthogonal coil detectors, each set placed on either end of the structural member, the coil detectors and the structure forming a local coordinate system. The receiver may further include an orientation sensor to determine the orientation of the local coordinate system relative to an external coordinate system; a 3-d position measurement unit to determine the position of the local coordinate system relative to one or more points external to the receiver; and a wireless interface to communicate with other devices in a sensor network.

These and other embodiments are further discussed below with reference to the following figures.

Figure 1:
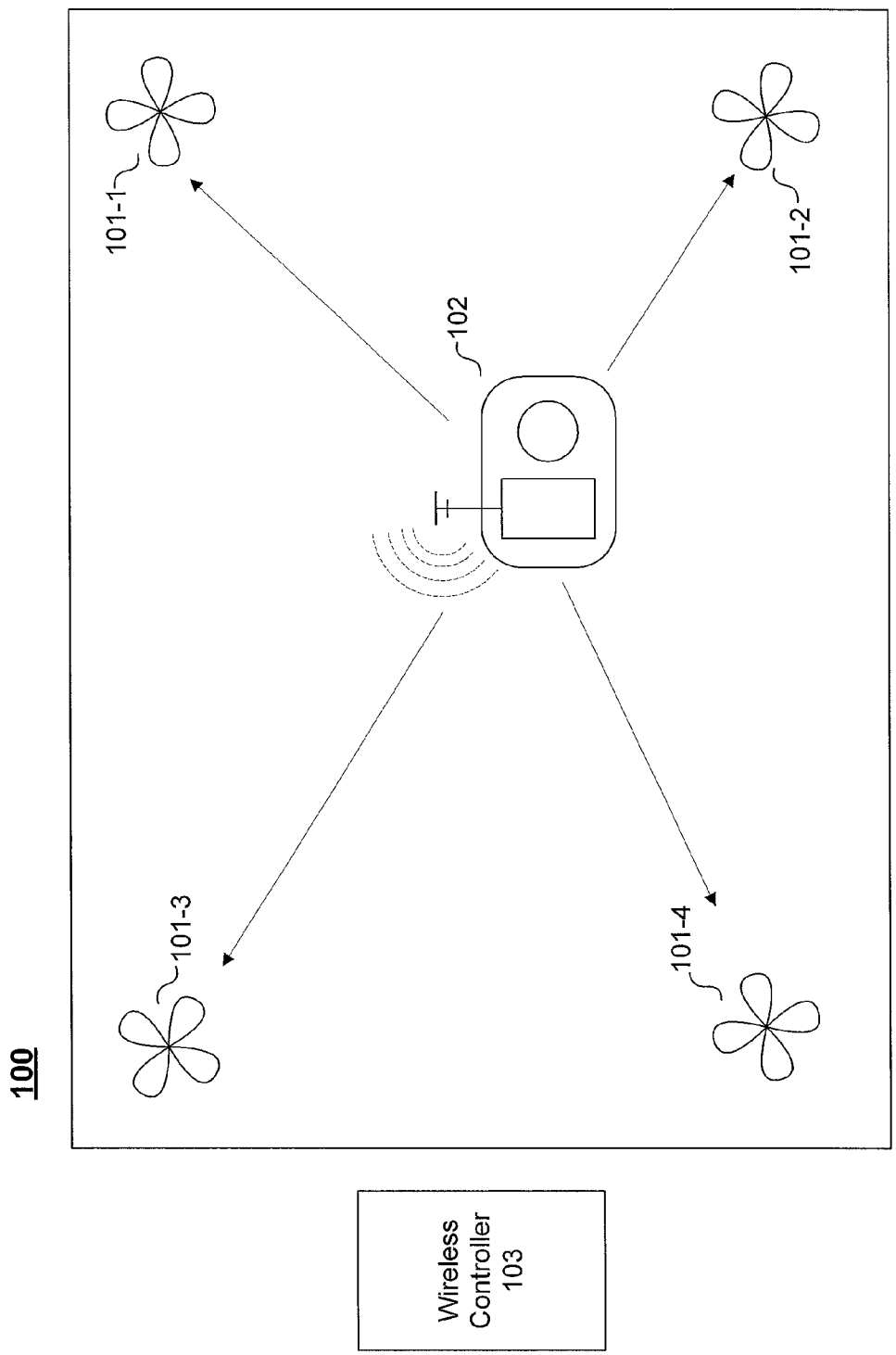
FIG. 1 illustrates the topology of multi-axis dipole receiver modules distributed at various locations in a defined space, forming a sensor network consistent with some embodiments of the present invention.

In the figures, elements having the same designation have the same or similar functions.

DETAILED DESCRIPTION

Precise location technology is based on the optimization of data from many sensors against a physical model of the magnetic field expected from a utility line or dipole antenna. The method eliminates the need to bring the measurement equipment to specific points related to the utility cable or pipe in order to validate position. Legacy instruments find the "peak" or "null" in the signal in order to confirm pipeline or cable position. Using the precise location method, the equipment need only be in the approximate vicinity to calculate position with corresponding confidence bounds. Using three-dimensional (3-d) magnetic field sensors, a triaxial accelerometer and digital compass, the method identifies the offset, depth, range, current, and yaw angle to the underground utility regardless of its position in the radiated field. In combination with a professional global navigation satellite system (GNSS), the utility position can be automatically geo-referenced in real-time, even when the centerline of the utility is behind a fence or covered by impassable vegetation. Furthermore, detected field distortion (often a problem with magnetic-field based measurements) is folded into the reported position error.

In legacy systems employing such precise location methods, multiple sequential, synchronized measurements must be collected across a region exposed to the emitted magnetic field from a linear utility conveyance or dipole point source. Each of these measurements must share a common physical reference frame and phase reference. For the previously disclosed methods, this involves mounting a 3-d sensor on a moving platform, and relying on a transmitter-imparted phase reference signal. Then a series of discrete measurements are collected as the device is traversed through the magnetic field, prior to calculation by the precise location engine.

Embodiments of the present invention relate to a method and apparatus for estimating repeated, real-time precise positions of a target object in a complex electromagnetic environment. In particular, some embodiments of the invention allow unambiguous determination of repeated three dimensional positions without restriction on the geometrical relationship between detection receivers and transmitters of the objects to be located. Some embodiments do not rely on the collection of sequential measurements as a single receiver is displaced through a region of interest. The applications of embodiments of the invention are in the realm of precise locating systems where over a localized area a set of known dipole magnetic fields generated from a set of transmitters are measured with a set of physically separated receivers, and a processing system internal or external to the transmitter can continuously track the precise position of each transmitter target object within the area. Alternatively, the same set of receivers can collaborate to accurately position a radiating linear conveyance, such as an underground pipeline or cable.

In some embodiments, the tracked object may transmit electromagnetic field radiation to receivers located at known positions. In such systems, the tracked object may be located by measuring the electromagnetic field strength from a signal generated by a transmitter at an unknown location from a set of fixed multi-axis receivers. The receivers use one or more electromagnetic coil sensors, modeling a set of expected electromagnetic strengths from a signal generated by a transmitter at a postulated position. For each one of the electromagnetic coil sensors in the receivers, a modeled set of expected electromagnetic field values corresponding to a model for a given position of the dipole transmitter may be obtained. An estimate of parameters related to the unknown location of the dipole transmitter may be obtained based on the residual error between the measured set of electromagnetic field values at the receivers and the modeled set of expected electromagnetic field strengths. A final estimated parameter set is determined after the residual error has converged to a minimum tolerance. In some embodiments the field strength measured by the set of receivers is complex, including both magnitude and phase, and in other embodiments only a magnitude is measured.

Consistent with some embodiments of the present invention, a method for determining the position of a tracked object, asset, or person (carrying a dipole transmitter) includes measuring a set of electromagnetic field strengths transmitted from the tracked object with detectors or receivers at known locations. In that case, the electromagnetic field strengths from a signal generated by the tracked object are modeled at the receiver locations in order to determine the location of the tracked object.

According to embodiments disclosed herein, a sensor network of receivers may be distributed around a volume to determine the location of either a dipole antenna (sonde locating system) or a line (line locating system). In some embodiments, a sonde or a conducting line is coupled to a transmitter emitting electromagnetic radiation at a certain frequency and having a known phase. In other embodiments, the transmitter may have an unknown phase, but measurements at one of the stationary receivers are used as the phase reference for the system. A sensor network including receivers coupled to detect electromagnetic radiation at the frequency provided by the transmitter is used in conjunction with a controller, including a processor circuit. The sensor network provides the controller with measurements of the electromagnetic field produced by the transmitter. The controller uses a processor circuit to input the measurements from each of the receivers and the known positions of the receivers, to find the unknown position of the transmitter. According to some embodiments, communication between the receivers in the sensor network, the transmitters, and the controller may take place via a wireless network.

FIG. 1 illustrates a geometry for sonde locating system 100 according to some embodiments. As shown in FIG. 1, four 3-axis receivers 101-1 through 101-4 are placed at known locations relative to each other within an enclosed space. A single transmitter 102 with a dipole antenna may be moving through the space. As further shown, transmitter 102 may communicate with wireless controller 103. Each of receivers 101-1 through 101-4 may include multi-axis detectors. In some embodiments, each of receivers 101-1 through 101-4 includes three mutually orthogonal coils. In some embodiments, each of receivers 101-1 through 101-4 includes two sets of three orthogonal coils separated by a rod, forming a spar receiver. In some embodiments, receivers 101-1 through 101-4 may communicate with wireless controller 103.

Transmitter 102 may include a dipole antenna emitting an electromagnetic field having amplitude and phase. In some embodiments, transmitter 102 may include more than one dipole antenna, for example three dipole antennas oriented perpendicularly to one another. In such cases, each of the three dipole antennas may provide a dipole electromagnetic field at a separate frequency, in which case receivers 101-1 through 101-4 may be configured to distinguish based on frequency each dipole antenna from transmitter 102. Transmitter 102 may be referred to as a sonde, and thus embodiments of a precise location system consistent with FIG. 1 may be referred to as sonde location system 100. Although four receivers 101-1 through 101-4 are shown in FIG. 1, there may be any number of receivers that locate transmitter 102. For example, three receivers 101-1 through 101-4 can be utilized to locate transmitter 102.

As shown in FIG. 1, wireless controller 103 may collect all of the electromagnetic field strength data measured by receivers 101-1 through 101-4 and model the location of transmitter 102 relative to receivers 101-1 through 101-4 based on that data. In some embodiments, one of receivers 101-1 through 101-4 may be utilized as wireless controller 103. In some embodiments, wireless controller 103 may be a stand-alone center for receipt and display of the data.

Consistent with some embodiments, a precise locating system for a sonde transmitter 102 includes a network of receivers 101 having at least one electromagnetic coil detector. Receivers 101 are configured to measure the electromagnetic field magnitude and direction generated by a dipole antenna in sonde transmitter 102. The dipole axis of transmitter 102 may be at an arbitrary orientation relative to the axis of the electromagnetic coil detector in receiver 101. Coil detectors in receivers 101 may provide quadrature or magnitude signals indicating a set of measured coded electromagnetic field strengths related to a detected transmitter dipole. In some embodiments, more than one sonde transmitter (or target-transmitter) 102 may need to be located. Furthermore, both a sonde and one or more linear utility conveyances may be simultaneously located. This may be the case in a directional drilling application in which a critical pipeline must be avoided during drilling operations. Thus, the position of the drilling tool and that of the pipeline need to be precisely known at every point in time. In such cases, each transmitter 102 may transmit signals with a specific identification code. A code demodulator in receiver 101 may be used to unscramble individual transmitter signals as seen at the receiver.

In some embodiments, receiver 101 and transmitter 102 include a data channel coupled to controller 103 through a wireless network. The data channel may provide controller 103 the field strength values measured by receivers 101 along each dipole axis. Furthermore, the data channel from transmitter 102 may provide controller 103 with a value of the power level of the signal being sent out by the transmitter. Controller 103 may include software to model a set of expected complex electromagnetic strengths at the receiver locations assuming a hypothetical location for transmitter 102. The set of expected electromagnetic field values corresponds to a model for the set of fixed multi-axis receivers and estimated parameters related to the unknown location of the transmitter (such as position and orientation of the transmitter). The residual error between the measured set of complex electromagnetic field values and the modeled set of expected complex electromagnetic field strengths is obtained. And a final estimated parameter set for the unknown location of the transmitter is determined after the residual error has converged to a minimum tolerance. In other embodiments, the estimated parameter set may be determined by software on each one of the receivers in the sensor network.

In accordance with some embodiments consistent with FIG. 1, transmitter 102 may operate in a low frequency arena. Because of the Low Frequency (LF) and the fact that the set of dipole fields are generated and sensed using the magnetic field, some embodiments of the invention are directly applicable in complicated indoor (industrial, office, residential) and outdoor environments that normally present accuracy challenges for other precise location methods operating at much higher frequencies. Some embodiments of the invention may further compensate for field distortions, especially in indoor locating systems. In embodiments used for outdoor locating systems, electromagnetic field distortions may be less relevant for locating purposes, and may not be necessary to apply distortion compensation methods.

Some embodiments consistent with the disclosure herein may include a line locating device. Such line locating devices and methods may be as disclosed in U.S. Pat. No. 7,356,421 by Gudmundsson et al., filed on Apr. 6, 2005, assigned to Metrotech Corporation, Inc., and incorporated herein by reference in its entirety (hereinafter, the '421 patent). Also, devices and methods for line location may be as disclosed in U.S. Pat. No. 7,057,383 by Schlapp et al., filed on May 6, 2004, assigned to Metrotech Corporation, Inc., and incorporated herein by reference in its entirety (hereinafter, the '383 patent). In some embodiments, a line locating device may include a plurality of spatially distributed receivers and a transmitter, as described in detail in FIG. 2.

Figure 2:
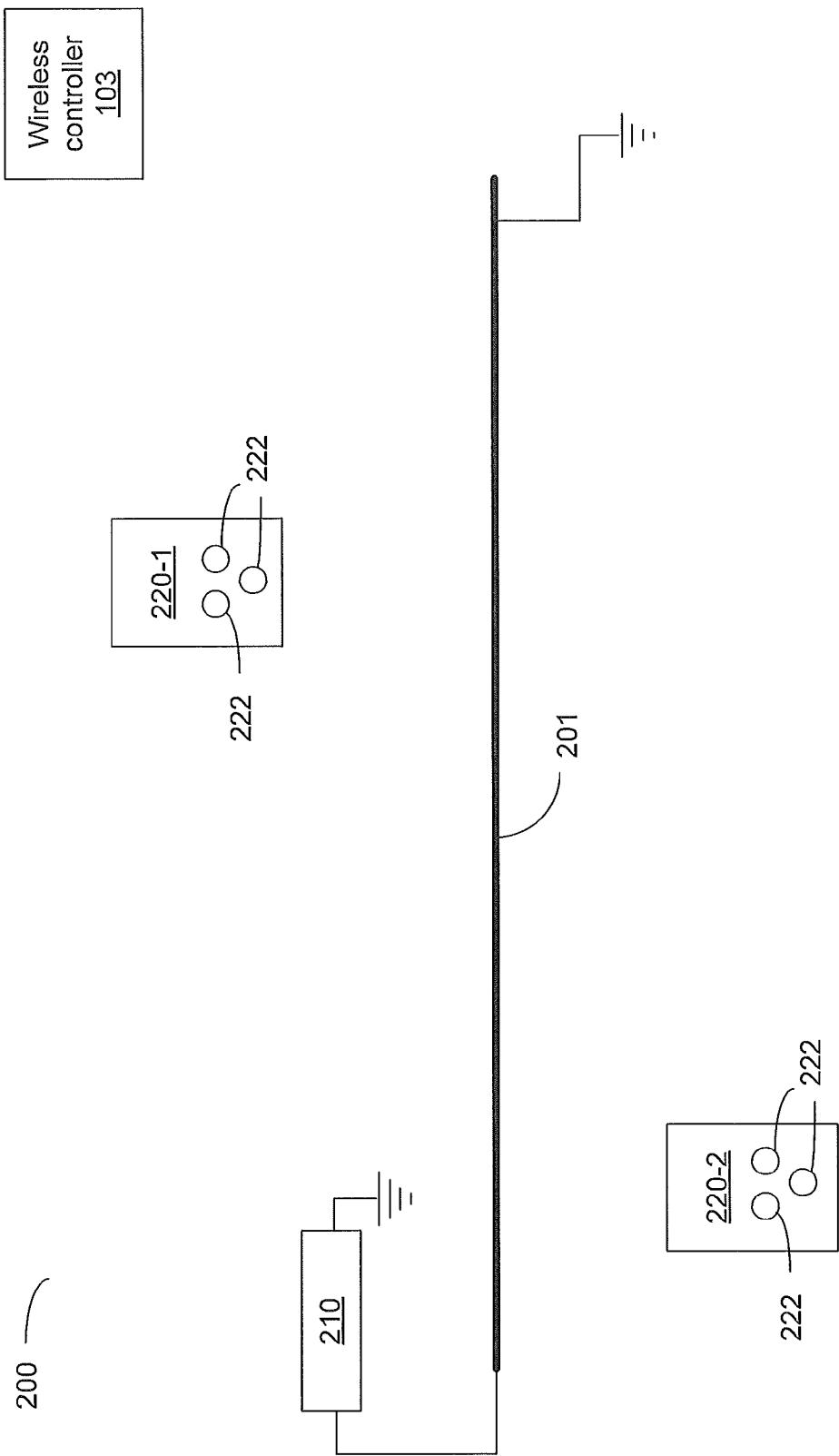
FIG. 2 illustrates location of a line object according to some embodiments of the present invention.

FIG. 2 shows line locating system 200 according to some embodiments. Line locating system 200 may include conducting element 201 that needs to be precisely located, transmitter 210 coupled to element 201, a plurality of locators 220-1, 220-2, and wireless controller 103. Element 201 may include an underground power line, a pipe or conduit, or a construction structure having conductive elements within. For example, conducting element 201 may be part of a tunnel having electrical wires running along the tunnel. In some embodiments, conducting element 201 may be part of a metal framework normally used to reinforce concrete or cement structures.

According to some embodiments, transmitter 210 couples a current signal onto conducting element 201. The current signal has a frequency and a phase that may be precisely controlled and monitored by wireless controller 103. Wireless controller 103 may be as described above in relation to FIG. 1, according to some embodiments of system 200. While conducting element 201 may be below ground, transmitter 210 may be located above ground, coupled to element 201 directly at an above ground junction box or by digging to find element 201 at a known location. Transmitter 210 may also be inductively coupled to element 201, producing a time varying electrical current in element 201.

Locators 220-1 and 220-2 may include receiver circuits having detectors 222 for determining an electromagnetic field. For example, detectors 222 may include coils providing electrical signals in the presence of time varying magnetic fields. Locators 220 may process the electrical signal provided by detectors 222, and the results may be transmitted wirelessly to controller 103 for further processing. Although FIG. 2 shows only two locators 220-1 and 220-2, some embodiments consistent with the concept disclosed in FIG. 2 may include a larger number of locators 220. Any number of locators 220 may be utilized. Furthermore, locators 220-1 and 220-2 may be mobile or fixed in location. The distance between locators 220 may be a few centimeters (cm), or several meters (m), depending on the precision and depth needed in a given application. As long as a locator 220 can sense a signal, the larger the number of 'nodes' or locators 220 in the sensor network, the more precise the measurement will be. Other constraints such as cost and deployment logistics may limit the number of 'nodes' used in the sensor network.

Using a sensor network including a plurality of distributed locators 220 provides the added advantage of having standalone sensors 220 placed farther apart from each other, and at better measurement locations. The form factor of each device does not limit the ultimate precision of the measurement due to the distributed nature of the sensor network. Specifically in the case of a line locating system, having a plurality of sensors 220 placed farther apart from each other may provide further depth sensitivity. A distributed sensor network provides improved "peripheral vision" of a target laying outside of an accessible area, since in such cases geometric diversity in the magnetic field shape requires expansion of the measurement volume. Examples of such situations when utility conveyances are outside the bounds of normal detection ranges may be utility conduits placed under buildings, rivers, or on private lands. Accurate detection of the conveyance depth, offset, and range are sometimes impossible using existing methods.

In some embodiments consistent with precise sonde locating system 100, or precise line locating system 200, an underground structure may be located. For example, a tunnel built for illegal trafficking of goods or drugs may be tracked using embodiments consistent with FIG. 1. In such embodiments, a precise location tracking system may be used to track a robot carrying a sonde transmitter. In some applications, a deep pipeline crossing under a river may be located by placing receivers 220 on the shore of the river, separated by a few tens of meters, after energizing the pipeline with a transmitter signal.

According to embodiments consistent with FIG. 1, skiers in avalanche prone areas may carry beacons such as transmitter 102 (magnetic dipole transmitters) as a safety measure in the event of a snow slide. In the event of a snow avalanche burying a beacon-carrying skier, rescue operations may be facilitated if unaffected companions deploy magnetic dipole receivers 101 connected together in a wireless network consistent with FIG. 1.

In a sonde location system consistent with FIG. 1, the 3-d location of transmitter 102 can be precisely estimated and tracked during the course of the movement using the following process: Describe each dipole axis transmitter location by the vector $$A = [x, y, z, \theta, \phi] \quad (1)$$

wherein, x, y, and z are scaled in local coordinates with one arbitrary transmitter location chosen as the control point for the local coordinate system, such that at that location, the vector A is defined as [0, 0, 0, 0, 0];

θ is the pitch angle of transmitter 102 about the x-axis;

φ is the yaw angle of transmitter 102 about the dipole axis.

Consistent with some embodiments, a method for tracking the location of a roving transmitter 102 includes estimating the projected path for transmitter 102 from a beginning point and the next estimated location. Further, the method may include communicating identification codes for transmitter 102 to a set of receivers 101 having electromagnetic coil detectors. At least one electromagnetic coil detector in receiver 101 is configured to measure the electromagnetic field magnitude and phase generated by transmitter 102 using the identification code of transmitter 102. The electromagnetic coil detector in receiver 101 may be at an arbitrary orientation relative to the axis of dipole transmitter 102.

In some embodiments of the invention, a software model may be used to track the unknown transmitter parameters such as location and orientation. The software may include a dynamic model for the rate of change in position and orientations of transmitter 102 from one measurement point to another. A means to combine the rate of change in positions and orientations of transmitter 102 with the position estimated from the field strength, such as a Kalman filter, may also be included in the software model. In some embodiments, this dynamic model is further supported by one or more motion sensors.

Precise location tracking systems as disclosed in FIGS. 1 and 2 include a set of receivers (101, in FIG. 1, and 220 in FIG. 2) and a set of transmitters (102 in FIG. 1, and 210 in FIG. 2). According to the embodiments illustrated in FIGS. 1(2), receivers 101(220) may have known positions and be fixed (non-moving), or in motion. In some embodiments, the reverse may be true; that is, a plurality of transmitters may have known positions and the receivers may have unknown positions to be determined. In some applications, a plurality of individual transmitters 102 (cf. FIG. 1) or 210 (cf. FIG. 2) having unknown positions may be present.

In some embodiments, the magnetic field strength (or "H-field") may be used for position estimation rather than the more typical electric field strength (or "E-field"). An exemplary embodiment called Low Frequency Field Ranging (LFFR) is an active method operating in the low frequency RF band. The LFFR model may operate in the frequency range of 20 Hz to 100 kHz. In some embodiments described herein the transmitter and receiver dipole loop antennas may operate efficiently, be stable (transmitters) and have reasonable sensitivity (receivers), for a well determined frequency range.

Figure 3:
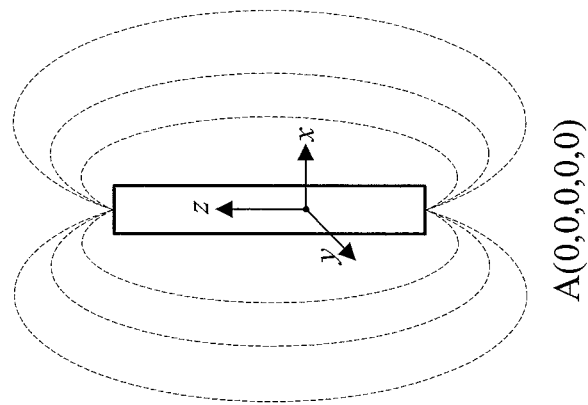
FIG. 3 illustrates coordinate systems of a dipole type transmitter.
Figure 3:
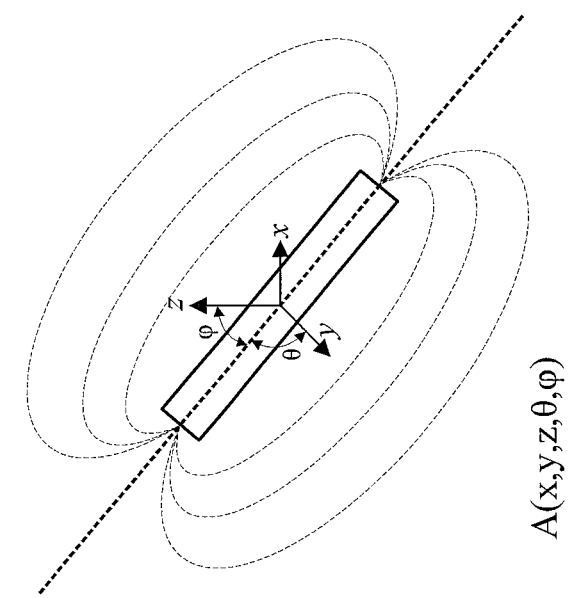

FIG. 3 illustrates a coordinate system for transmitter 301. Transmitter 301 may be an arbitrary one of the transmitters in the space that is assigned location vector A equal to [0, 0, 0, 0, 0] and transmitter 302 being a different arbitrary one of the transmitters in the space with location vector A equal to [x, y, z, θ, φ] (cf. Eq. (1)). The coordinate system utilized in setting up the receiver array 101-1 through 101-N may be "right handed." That is, x is positive to the right of the direction of travel y, with z positive up from the origin, y positive forward from the original, and the sign of the angles defined by the "right hand rule." In some embodiments, the coordinate system is fixed in an earth-based system (i.e., referenced to a geographic location).

Figure 4:
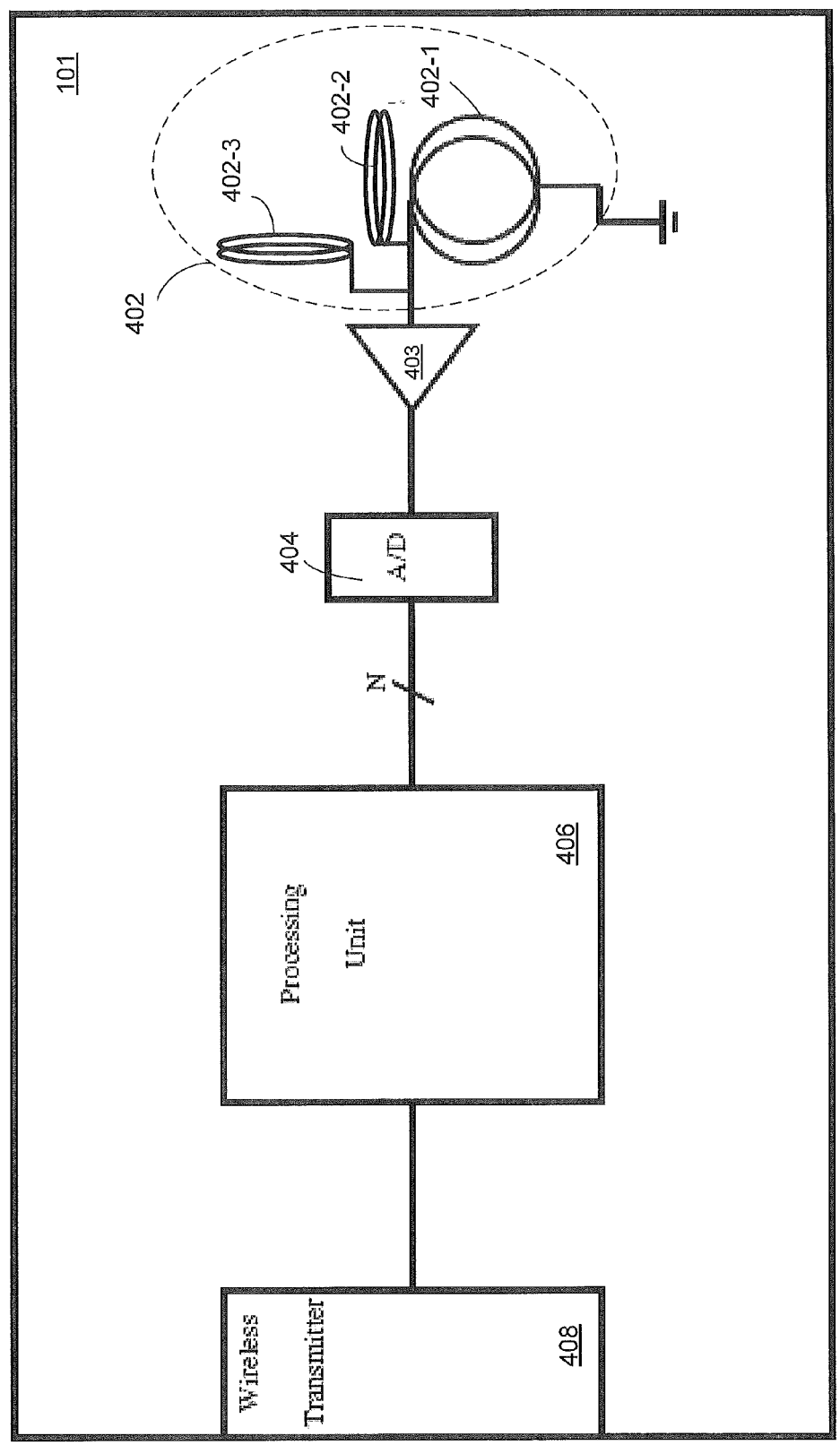
FIG. 4 illustrates a block diagram of a receiver according to some embodiments of the present invention.

FIG. 4 illustrates a block diagram of receiver 101, according to some embodiments of the present invention. As shown in FIG. 4, receiver 101 may include receive antenna 402, amplifier 403, and signal processing electronics 404 coupled to processing unit 406. Data from processing unit 406 is wirelessly transmitted to controller/processor 103 through wireless transmitter 408. In some embodiments, wireless transmitter 408 may be a ZigBee™ transceiver or Bluetooth™ transceiver for data communications. Electromagnetic fields measured at receive antenna 402, as well as an identification code for transmitter 102, may be transmitted to controller/processor 103. In some embodiments, processing unit 406 is used to estimated parameters (cf. Eq. (1)), allowing them to be shown on the receiver via a display (not shown), while in other embodiments the computation is done on a remote controller.

According to some embodiments consistent with FIG. 4, receiver 101 may include more than one receive antenna 402. For example, receiver 101 may include three receive antennas 402-1, 402-2, and 402-3, oriented along mutually perpendicular axes. Some embodiments may include two receive antennas, or more than three receive antennas. According to some embodiments, receive antennas 402-1 through 402-3 are coils as described above in relation to detectors 222 in line locating system 200. In embodiments having three mutually perpendicular antennas as illustrated in FIG. 4, three mutually perpendicular components of the electromagnetic field produced by transmitter 102 may be measured. Thus, a more complete set of equations may be available in the electromagnetic map, so that a more precise computation of estimated parameters (Eq. (1)) for transmitter 102 may be obtained.

Figure 5:
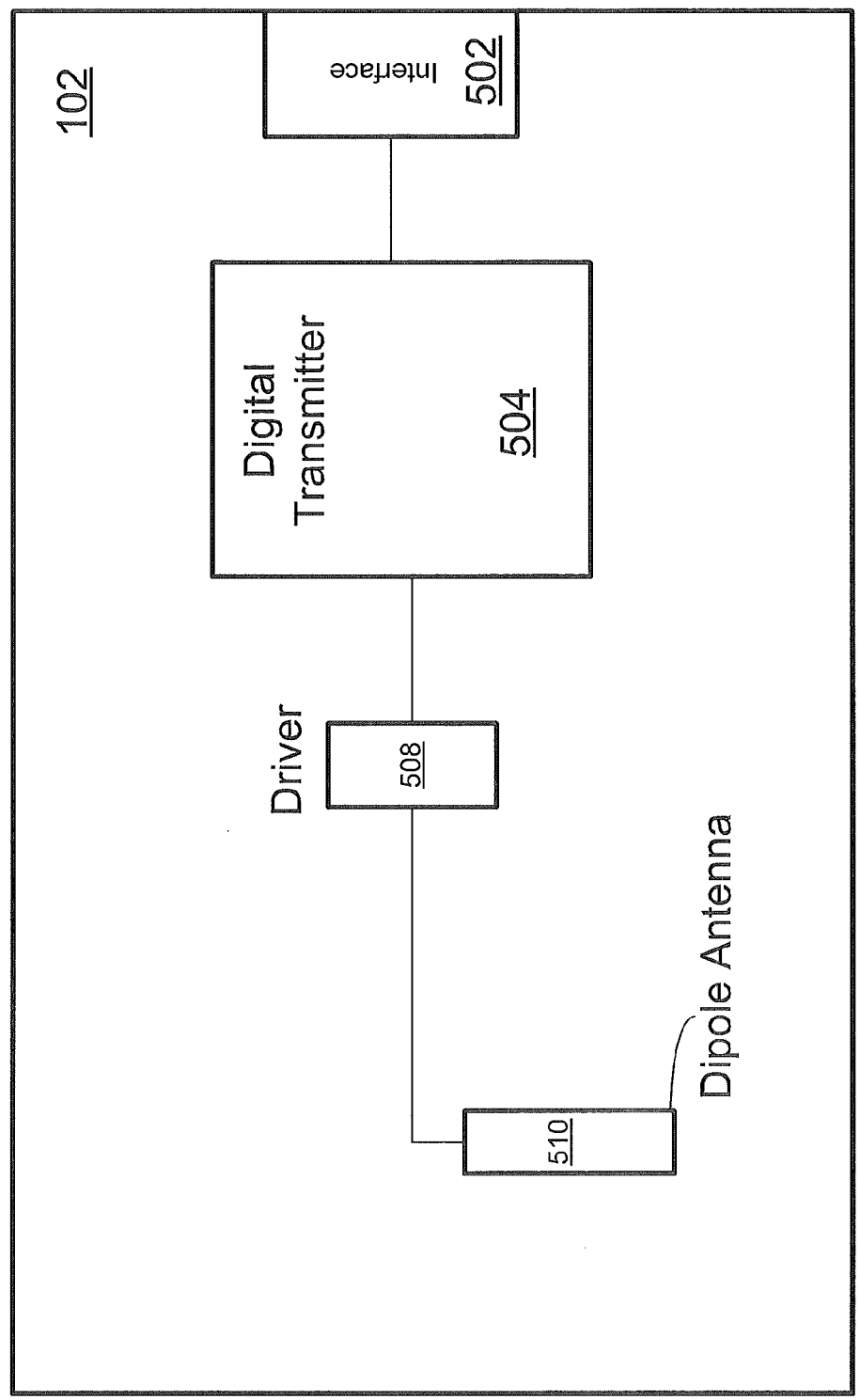
FIG. 5 illustrates a block diagram of a transmitter according to some embodiments of the present invention.

FIG. 5 illustrates an example of transmitter 102 according to some embodiments of the present invention. As shown in FIG. 5, transmitter 102 includes dipole antenna 510. In some embodiments, antenna 510 may include a plurality of mutually orthogonal dipole antennas. In some embodiments, dipole antenna 510 includes a current transformer having a primary winding, a ferrite toroid, and a low resistance secondary loop. Dipole antenna 510 is coupled to driver 508. Digital transmitter 504 communicates with controller 103 through a wireless interface 502. Transmitter 102 may provide information to controller 103 such as the power level of the signal being transmitted through dipole antenna 510. Transmitter 102 may also provide a timing signal to controller 103 in order for controller 103 to establish a phase differential between transmitter 102 and receivers 101 in sonde system 100. According to some embodiments, one of the stationary receivers may be designated to be the phase reference for the system.

In some embodiments, receivers 101-1 through 101-N all simultaneously de-modulate a coded sequence at a defined carrier frequency compatible with H-field inductive coupling between transmitter and receiver loop coils. Using Direct Spread Spectrum Sequences (DSSS), a unique coded sequence may be assigned to each transmitter. The receiver (which has a priori knowledge of the possible sequences in the received signal) may send to controller 103 the measured signal with each coded sequence corresponding to each detected transmitter in receiver 101. When a transmitter is active and has sufficient signal strength at the location of the receiver, the correlation for that receiver will peak at a certain time delay. The field strength of that particular transmitter is a scaled version of the field strength magnitude at the measurement point, and the time delay is a measure of the signal phase.

Alternatively for a low number of transmitters, frequency-division multiplexing (FDM) techniques may be used to distinguish transmitters.

Figure 6:
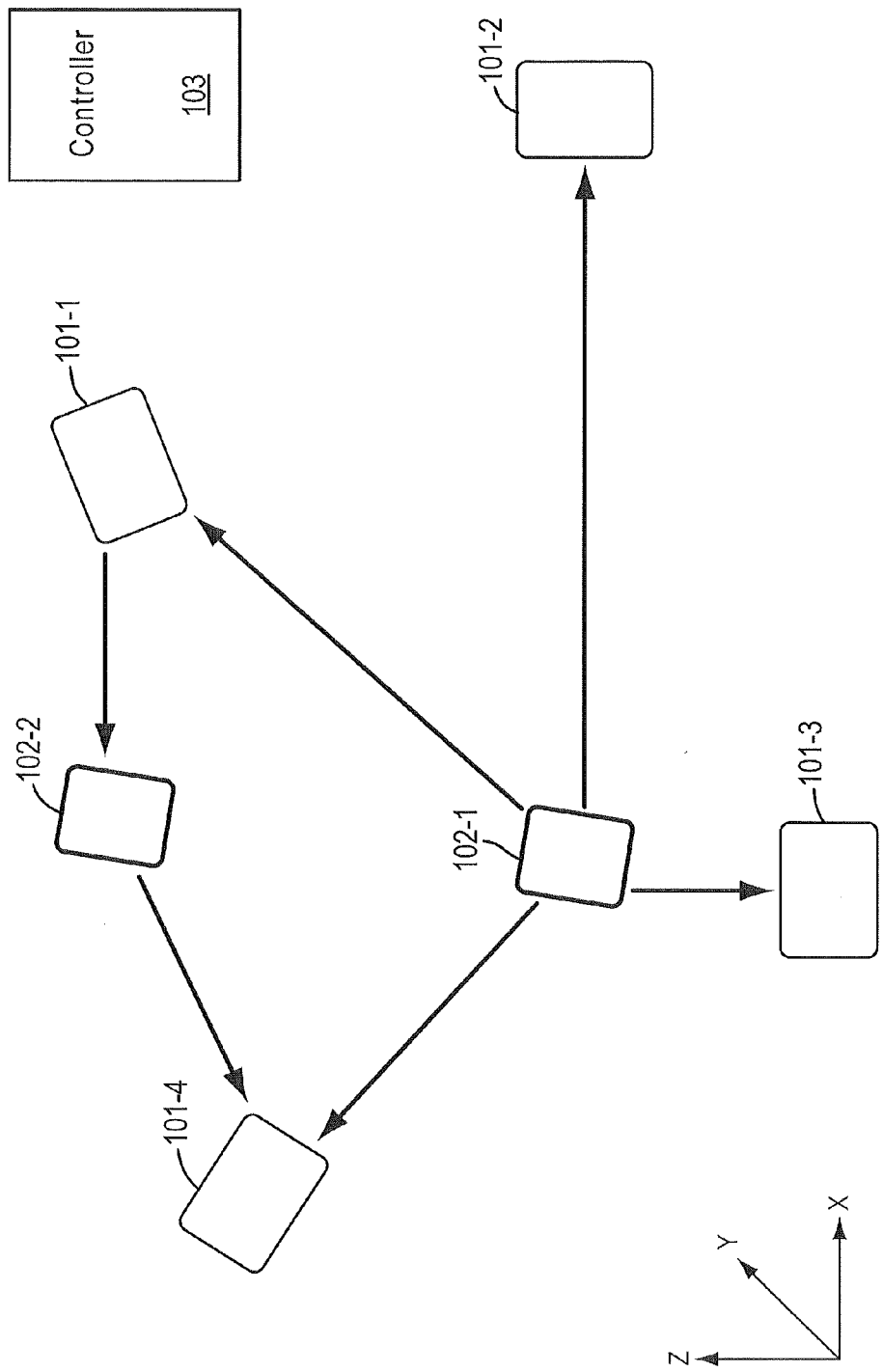
FIG. 6 illustrates a controller based precise location tracking system, in relationship to a distributed set of transmitters at unknown locations, and receiver modules according to some embodiments of the present invention.

FIG. 6 illustrates operation of precise locating system 600 with multiple transmitter-target objects 102-1 and 102-2 (although any number of transmitter-targets 102 may be present) and multiple receivers 101-1 through 101-4 (although any number N of receivers 101 may be present). At the unknown transmitter position (i.e., the unknown location of transmitter 102-1 or 102-2), the measured field strengths and phases of receivers that correlate sufficiently well with the known code sequences are grouped into a matrix of 3×M, where M is the number of receivers detecting a transmitter (either 102-1 or 102-2). In some embodiments as illustrated in FIG. 6, more than one transmitter 102 may be used. In such cases, each transmitter 102-1 and 102-2 will encode the signal emitted by dipole antenna 510 (cf. FIG. 5) at a specific frequency unique to a given transmitter. In this manner, receivers 101 and controller 103 will be able to associate certain measurement to a specific transmitter or transmitter 102. Some embodiments may use code-division multiplexing techniques to distinguish the signal provided by different transmitters or transmitters 102. Further embodiments may use the phase of the signal between different transmitters to differentiate between them.

In some cases, there may not be 3 measurements from a receiver 101 so that the total number of measurements may be smaller than 3M. These values are transmitted by receivers 101 to controller 103 using wireless transmitter 408 (cf. FIG. 4), according to some embodiments. Controller 103 compares the measurements from receivers 101 to a modeled set of field strengths computed from a hypothesized parameter vector consisting of the 3-d position and the relative orientation (pitch, yaw) of the transmitter with respect to each receiver axis. As with the optimization method in U.S. patent application Ser. No. 12/315,696 "Precise Location and Orientation of a Concealed Dipole Antenna," by Johan Overby, James Waite, Kun Li, and Dimitar Gargov (the '696 application), which is assigned to Metrotech Corporation and is herein incorporated by reference in its entirety, a new parameter vector is estimated relative to the unknown location based on the residual error between the measured set of electromagnetic field values from all detecting receivers, and the modeled set of expected electromagnetic field strengths, wherein a final estimated parameter set is determined after the residual error has converged to a minimum tolerance.

Magnetic field distortions can bias any location method that relies on a fixed physical geometric model of the magnetic field shape to derive physical parameters. For example, in embodiments of sonde system 100 used for indoor applications, an individual dipole transmitter output can inductively couple to structural elements inside a building, for instance, metal joist structures or rebar reinforcements. The re-radiation of transmitter signal from these inductively coupled sources can distort the flux lines away from the ideal dipole shape at the point of measurement, resulting in positioning errors. Conventional systems are susceptible to such distortions and lack mechanisms for detecting when field distortion is present and when position estimates may have larger errors.

In embodiments consistent with line locating system 200 (cf. FIG. 2), receivers 220-1 and 220-2 may be deployed in an outdoor environment. In such embodiments, electromagnetic field distortion may be less pronounced than in indoor systems.

Conventional transmitter locating solutions do not provide a user with error bounds associated with determinations of transmitter position. Although customary in the GIS and geodetic worlds, systems have not adopted commonly accepted statements of error like RMS precision (1-σ error), Dilution of Precision, or 95% confidence bounds on 3-d position. Because of local field distortions, the accuracy of any particular position estimate can be biased when using physical models that are not adapted to local conditions.

Figure 7:
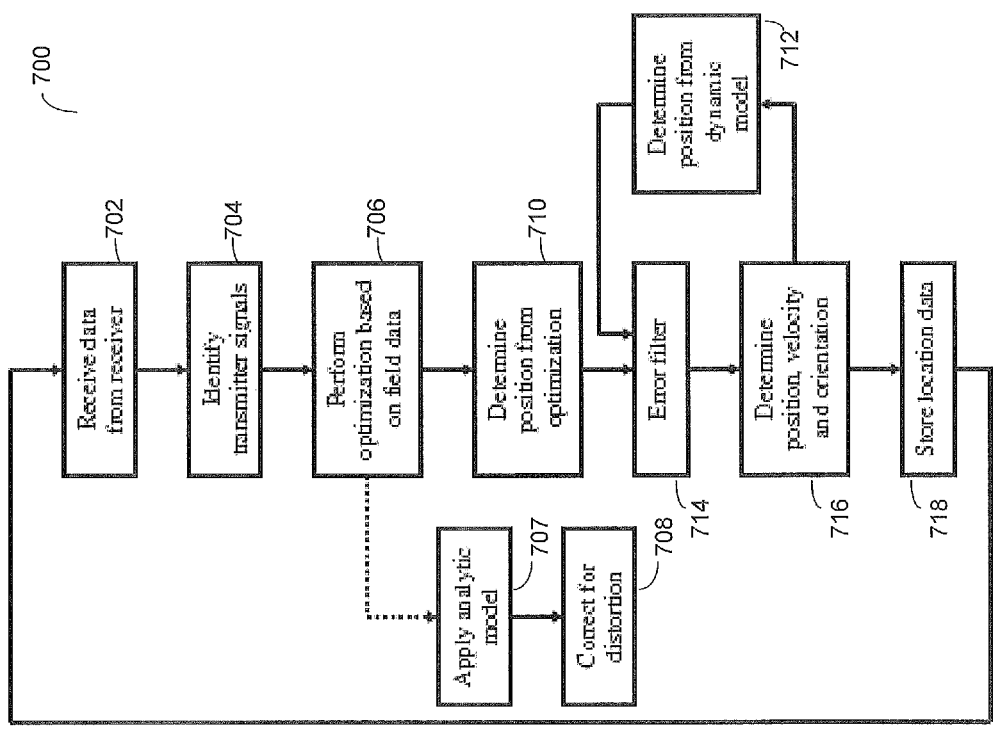
FIG. 7 illustrates a process flow for a controller-based precise location tracking system consistent with some embodiments of the present invention.

FIG. 7 illustrates algorithm 700 for a controller-based precise location tracking system, locating transmitter-targets 102 according to some embodiments of the invention. Algorithm 700 may be performed by a processor circuit included in controller 103, or by processor 406 (cf. FIG. 4) in one of receivers 101. In some embodiments, some or all of algorithm 700 may be implemented on board receivers 101 and the resulting position displayed on the receiver and/or reported to controller 103 for storage and tracking.

As shown in FIG. 7, processing starts in step 702 when data is received by controller 103 from receiver 101. In step 704, an identification of the signal strengths from each of the detecting receivers 101 is determined. In step 706, a model-based optimization is performed that places transmitter-target 102 at a position that produces the observed fields. In some embodiments, this modeling involves determining a set of expected complex electromagnetic strengths at the receiver positions. The complex electromagnetic strengths are modeled as produced by the set of detected transmitter-targets at an estimated position and orientation of the transmitter-target. For one or more of the electromagnetic coil sensors in the set of receivers 101, a set of expected electromagnetic field values corresponding to a model of the set of transmitter-targets is obtained in step 707. Correcting the estimated position and orientation using a model of field distortion due to environmental factors may be provided in step 708. Step 708 for distortion correction may be useful in indoor environments, where the sensor network may be deployed for an extended period of time and a "learning" process of the distortion environment may be applied. As mentioned above, for outdoor embodiments, such as in line locating systems, electromagnetic distortion may be less of an issue. Furthermore, deployment of a sensor network for an outdoor line locating application may be on a "one-time" basis, so that a "learning" iteration may be less feasible in such circumstances. Thus, some embodiments using outdoor line locating systems may not include step 708. A detailed description of the analytical model used in step 707 according to some embodiments is provided as follows.

The magnetic field emitted by an H-field loop antenna such as antenna 510 (cf. FIG. 5) is three dimensional. Accordingly, magnetic dipole equations describe the decaying field strength of the EM field of antenna 510 as the cube of the distance from transmitter 102. The dipole field equations are commonly known, see for example, the '696 application.

H-field measurements present complications if a conventional RSSI model is employed to find the location of a transmitter. Even though the relative reduction in H-field strength is a function of $1/r^3$, the 3-d magnitude of the H-field strength cannot be used to reliably estimate distance away from a dipole antenna using conventional RSSI methods. The signal strength varies with orientation of the dipole except when all field measurements are taken at positions symmetric with the dipole axis. Thus, without knowing the relative pitch and yaw of the receiving antenna with respect to the transmitting loop antenna, sequential measurements of the field strength magnitude cannot be related to distance.

As presented in the '696 application, it is possible to estimate both the arbitrary 3-d position and orientation of a dipole antenna if the signed signal strength from each of three mutually perpendicular axes are measured. Through an optimization process, these measurements may be combined with other such measurements made at known or hypothesized distance offsets from the first.

Whereas the '696 application focused on locating the source of the dipole radiation in a sonde utilizing a single receiver as it traverses through a space, embodiments of the present invention can locate one or more sonde transmitters 102 utilizing measurements of dipole radiation from arbitrary, distributed locations. In embodiments as disclosed herein, transmitter 102 including dipole antenna 510 may be located at the point of an unknown position to be estimated. Further, a set of multi-axis magnetic dipole receivers 101 are distributed around a space over which transmitter 102 can move. The axes of the sensing coils in receivers 101 may have both orthogonal and geometric diversity with respect to each other and with respect to other receiver(s). The positions and orientations of transmitter 102 may be obtained from measurements by the distributed system of receivers 101, as follows.

In one embodiment, the analytic model in step 707 is based on the dipole equations for the field strength $f_n$ at an estimated transmitter 102 position and orientation relative to each of the multiple receivers 101:

$$d'_n = R_n(p'_n - p'_{Tx}) \equiv \begin{bmatrix} x_n \\ y_n \\ z_n \end{bmatrix} \quad (2)$$

$$v'_n = \frac{a_n}{\|d'_n\|^5} \begin{bmatrix} 2x_n^2 - y_n^2 - z_n^2 \\ 3x_n y_n \\ 3x_n z_n \end{bmatrix}$$

$$f_n = r'^T_{Tx} R_n^T v'_n$$

Here, $p'_{Tx}$ and $r'_{Tx}$ are the estimated 3D position of the transmitter and a vector representing its estimated orientation compared to a reference coordinate system, $p'_n$ is the virtual 3D position of transmitter n, $R_n$ is a matrix representing the virtual rotation of receiver n compared to a reference coordinate system, and $a_n$ is the virtual signal strength of receiver n.

In some embodiments, the correction in step 708 is based on evaluating a correction function for the field strength for each receiver at the estimated transmitter position. This function may be determined and parameterized by a calibration method and may be computed using standard interpolation based on common basis functions such as splines or radial basis functions.

In step 710, a first estimate of the position and orientation of transmitter 102 is determined from the optimized modeling. In some embodiments, this involves estimating parameters related to transmitter 102 based on the residual error between the measured set of complex electromagnetic field values and the modeled set of expected complex electromagnetic field strengths. The parameters can include position, pitch, roll, and yaw. In step 712, a dynamic model of the movement of transmitter 102 may be used to determine a second estimate of position and orientation, and in step 714 the two estimates may be combined through an error filter to produce a final estimate of position and orientation in step 716. Step 716 may also determine a velocity that may be used by a dynamic model in subsequent processing. Alternatively, motion sensors (not shown) may provide inputs to the dynamic model. In step 718, the location is stored for the identified transmitter 102 and the algorithm restarts at step 702. In some embodiments, the position of transmitter 102 may be a three-dimensional position, a two-dimensional position, or a one-dimensional position. In some embodiments, optimizing the model includes applying a Levenberg-Marquardt algorithm. In some embodiments, a confidence bound for each of the parameters is determined after the residual error has converged to a minimum tolerance.

To carry out step 707, the location of each receiver 101 must be known relative to a chosen coordinate system. In some embodiments, each receiver may be placed at known coordinates using standard surveying methods. Some of these methods may include laser positioning, GNSS, ultrasonic ranging, dead reckoning from a reference position, RF ranging based on time-of-flight, or manual tape-measure measurements. Some embodiments use an aspect of differential real-time kinematic (RTK) GNSS positioning which allows one receiver of a multiple GNSS receiver system to act as a base station for the others. In this way, one sensor in a collection of networked wireless sensors may be positioned at a control point in the environment, which is taken as (x, y, z)=(0, 0, 0). Thus, the relative positions of all other sensors may be known in 3-d relative to the control point with centimeter-scale accuracy, in real-time. This is possible even when one or more of the RTK-enabled sensors are moving, and relies only on the sensors being placed in a location with a moderate number of GNSS satellites in view.

A further embodiment of the method is related to phase synchronization between the wireless sensors within the receiver network. Each set of measurements within a specific sensor or receiver 101 (composing one or more measurement axes), is based on a clock that is local to the node (receiver 101). The analysis in step 707 presumes that each of these local clocks is corrected for drift relative to a common, but arbitrary time base. Furthermore, each clock will also have an arbitrary offset relative to a master synchronization time which can itself be corrected, or handled as an additional optimization variable per node. Both drift and offset may be characterized by the introduction of synchronization events observable at a common instant in time at all nodes. Since a GNSS receiver is present at each node, then a one pulse-per-second time sync pulse is generally available. The local clocks on each of the nodes may be referenced to this time, ensuring time synchronization across the network. Equivalently, the coordinator node of the wireless network can itself source a repetitive "beacon" data packet that can also be used by the recipient nodes to synchronize to a common time base. The coordinator node of the network may be controller 103, according to some embodiments. While this method may include some jitter since the packet arrival time depends on the RF time-of-flight between nodes. However, the jitter error may be negligible at the low frequencies employed by the distributed tracking system.

In light of the foregoing, improvements over conventional methods are desirable in the location accuracy of concealed dipole transmitters or linear conveyances. Particularly, improvements derived from model-based precise location methods in the context of a deployed network of sensors may be utilized to improve the accuracy of measurements. In some embodiments of the present invention, such methods are utilized in comparing a measured EM field at the precise location system transmitter in a minimization process to an EM field model for the transmitter field components being detected along a plurality of axes. Adaptation via nonlinear optimization may be used to tailor the state parameters in the model to the EM field measurements and the best set of state parameters for a given measurement set may be attributed with the estimated location of the transmitter or transmitters. Residual errors in the optimization process may be used to provide an indication of the confidence in the state parameter estimates.

In some embodiments, the locating transmitter is configured to recover a phase reference that is synchronized with the transmitted EM signal. In the absence of signal interference and distortion, the phase of the EM field measured at the transmitter emanating from an individual transmitting dipole may be either 0° or 180°. Accordingly, the quadrature signals can be zero and the in-phase component of the measured EM field can be negative. In some embodiments, other methods of measuring the phase of an EM signal emitted by a transmitter may be utilized. For example, transmission of a pilot tone and pseudorandom training sequence in a similar method as digital subscriber line (DSL) modem systems may be utilized.

Furthermore, in embodiments having a single transmitter 102 within a network of receivers 101, relative phase measurements between each receiver 101 and transmitter 102 may not be necessary. While each receiver 101 may still need to be synchronized to a single timing reference, this may be provided by controller 103 itself. Controller 103 determines a single phase value for transmitter 102, and all other phases are automatically set since location of receivers 101 is known (even if it is not fixed). For indoor systems, receivers 101 may be synchronized to each other and controller 103 via wire or wireless communication. Consistent with some embodiments of the invention, the receivers may be time-synchronized to each other using any of common schemes of synchronizing network clocks. In some of those embodiments, the receivers 101 and transmitters 102 may be synchronized using a phase recovery method such as that described in U.S. Pat. No. 7,062,414 by James Waite and Johan Overby (the '414 patent), which is assigned to Metrotech Corporation and is herein incorporated by reference in its entirety.

Figure 8:
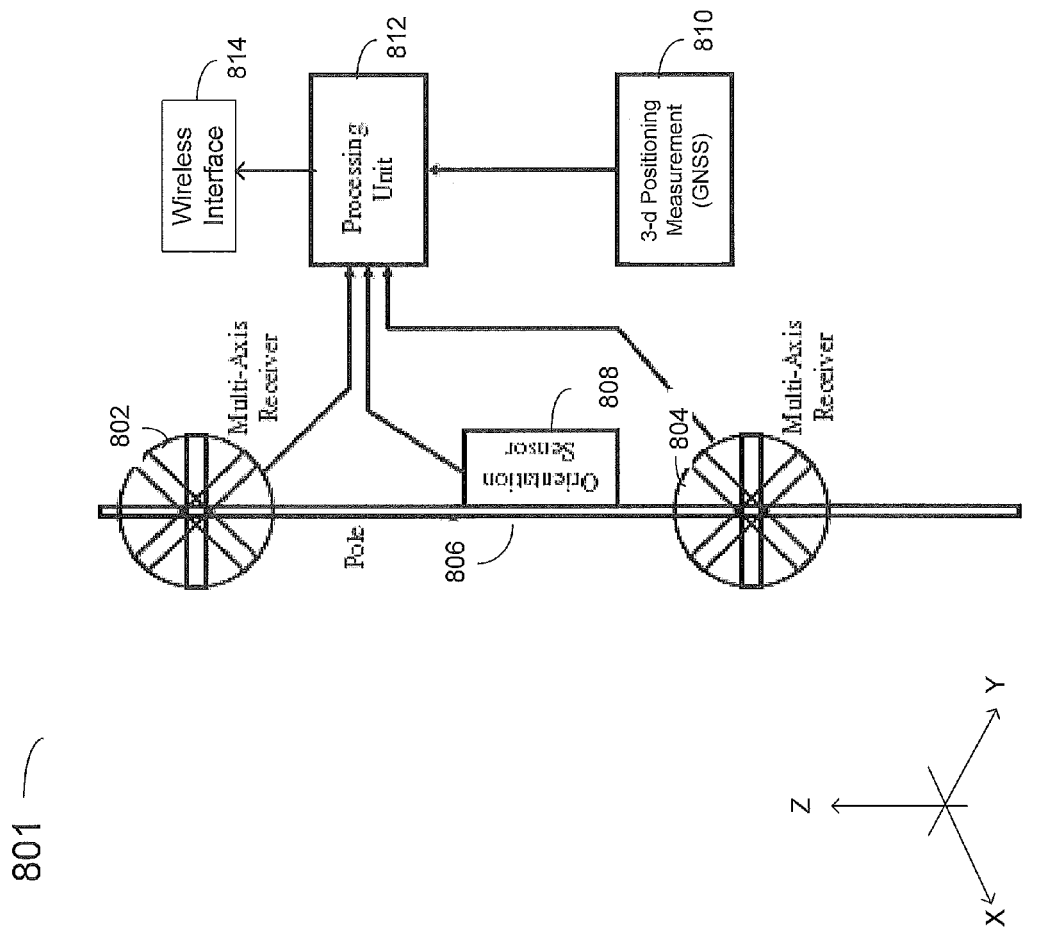
FIG. 8 illustrates an example of a receiver in a spar configuration according to some embodiments.

FIG. 8 illustrates an example of a so-called "spar" receiver 801. In this embodiment, two multi-axis receivers 802 and 804 are attached to a rigid structural member 806 along with a 3-axis orientation sensor 808. Receiver 801 may be referred also as a dual 3-axis spar receiver. Multi-axis receivers 802 and 804 may be composed of multiple single-axis receivers 101, each receiver for each axis measuring field strengths from one or more sonde transmitters or linear conveyances. A local coordinate system is defined by the mutually orthogonal axes of the coils in receivers 802 and 804, and structural member 806. In some embodiments, structural member 806 may define a local 'Z' axis. Orientation sensor 808 determines the orientation of the local coordinate system relative to an external coordinate system. For example, an external coordinate system may have a 'Z' axis as the absolute vertical line defined by gravity. A system 810 for measuring the 3-d axis position of pole 806 relative to one or more points external to receiver 801 is also included, either separate or affixed to the pole. Some embodiments consistent with FIG. 8 may use RTK-GPS based geographic positioning for system 810. In some embodiments laser tracking using robotic total stations may also effectively position the spar in the environment. All measurements are collected simultaneously and sent to processing unit 812, located on the reference receiver or on a separate controller, where transmitter and distortion parameters may be computed. A spar receiver 801 may be included as one of receivers 101 according to embodiments consistent with FIG. 1. Furthermore, a sensor network used for the precise location of target-transmitter 102 consistent with FIG. 1 may include a plurality of receivers 101 and a plurality of spar receivers 801.

In an outdoor system, synchronization between receivers 220 may be carried out using a GPS network, if available. In some embodiments of an outdoor precise locating system, synchronization beacons may be provided by controller 103 at an RF frequency of 2.4 GHz. In such embodiments, dephasing due to time of flight issues may not be relevant for precise locating systems operating at 10 kHz or less.

Some embodiments of the present invention may utilize various configurations of transmit and receive dipole antennas. For example, a transmitter 102 may include a single dipole antenna capable of emitting an EM field having an axis that is coincident with the longitudinal axis of the antenna. In some embodiments, transmitter 102 may transmit EM fields in a single or in multiple dimensions. For example, a transmitter module may transmit EM fields in two and/or three dimensions from a common housing. Similarly, receiver 101 may measure EM fields in a single or in multiple dimensions at one or more receiver EM coil cluster(s).

Transmitter position and orientation parameters may include a plurality of parameter states. For example, three position parameters may describe the position of the transmitter in x, y, z space, and three transmitter orientation parameters may describe the transmitter's orientation, known as roll, pitch, and yaw. In some embodiments, one or more EM coils may be utilized to take redundant measurements which may be used to improve transmitter position estimation confidence.

In some embodiments, target-transmitter 102 may be associated to a conducting element along a line (cf. FIG. 2). In such case, a transmitter parameter may specify a depth of the conducting element under a surface level, and a lateral position of the line with respect to the surface plane.

In some embodiments, geometric dimensions may be independently described by differing radiation models, and may conform to any EM field distribution including, for example, a dipole EM field distribution. In some embodiments, the two axes orthogonal to transmitter radial axis may have EM flux lines that depend on the unique aspects of the indoor environment. Since a separate model can be defined for each dimension in the multi-dimensional transmitter, the optimization method may proceed in the same manner, with each dimension separately optimized against a best fitted model.

Figure 9:
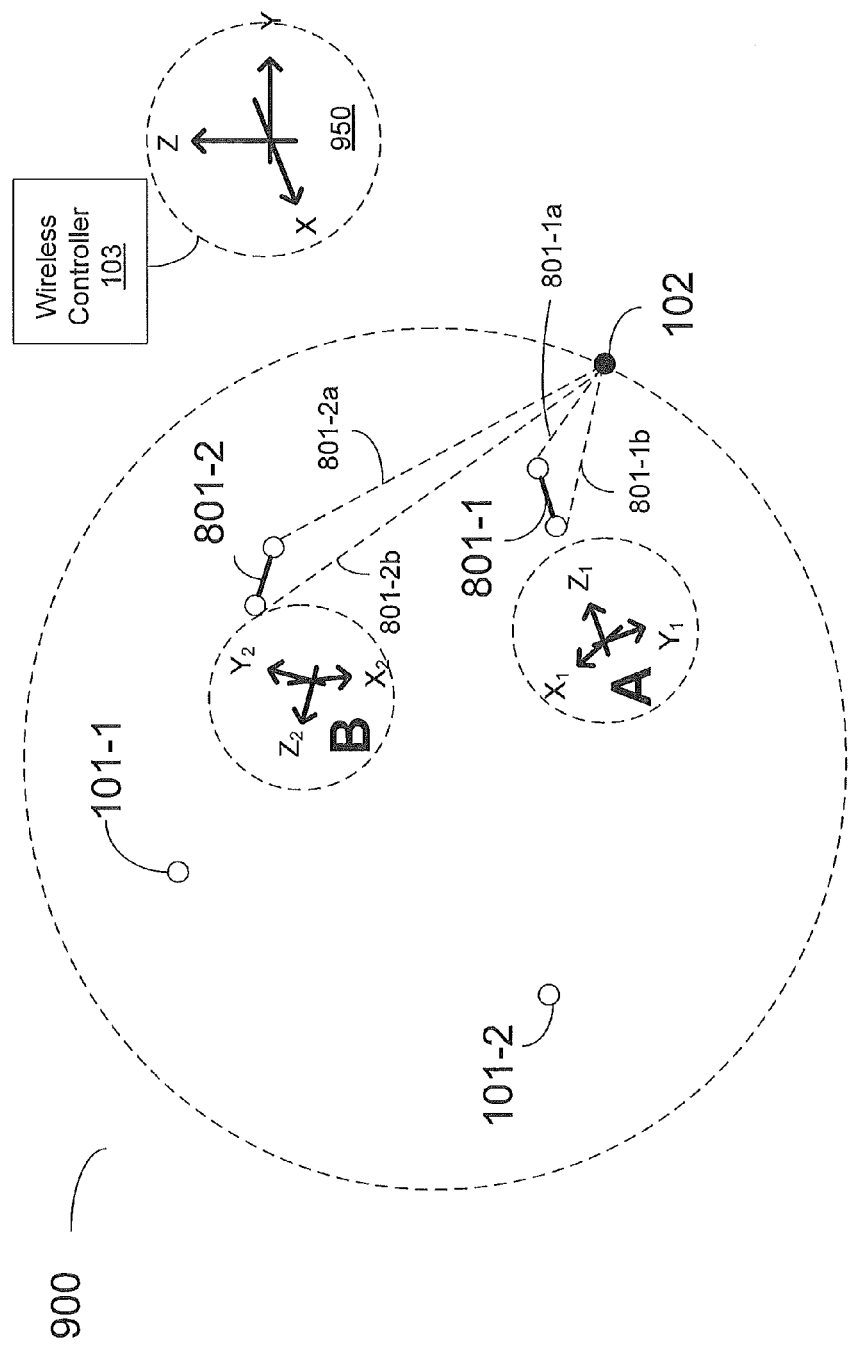
FIG. 9 illustrates a configuration for a controller-based precise location tracking system using a spar receiver according to some embodiments.

FIG. 9 illustrates a configuration for transmitter position tracking system 900 using spar receivers 801 according to some embodiments. System 900 may include receivers 101-1 and 101-2 (cf. FIG. 4), in addition to a plurality of receivers 801 (801-1 and 801-2). Some embodiments of tracking system 900 may include any number of receivers 801 in combination with receivers 101. System 900 may also include wireless controller 103 to control the operation of the entire system, and target-transmitter 102 which may be stationary at an unknown location. Target-transmitter 102 may be roving along a trajectory that needs to be determined.

According to embodiments consistent with FIG. 9, target-transmitter 102 may be located in the periphery of the sensor network including sensors 101-1, 101-2, 801-1, and 801-2. In such situations, a single position measurement as provided by receivers 101-1 and 101-2 may not be sufficient to accurately determine the location of target-transmitter 102. To complement this lack of accuracy, spar receiver 801-1 may provide two different measurements 801-1a and 801-1b from each of receivers 802 and 804 (cf. FIG. 8). The difference in measurement values provided by measurements 801-1a and 801-1b may substantially increase the accuracy in the locating of target-transmitter 102, using a single receiver 801-1. As target-transmitter 102 moves along, receiver 801-2 may provide a differential measurement 801-2a and 801-2b that enables an accurate locating of transmitter 102.

Also illustrated in FIG. 9 is the 3-d Cartesian coordinate system for receiver 801 (A), and for receiver 802 (B). Coordinates A and B may have an arbitrary orientation with respect to each other, and may even be rotating with respect to each other. However, processing units 812 and 3-d positioning units 810 in each of receivers 801 may provide controller 103 with the orientation of systems A and B relative to a fixed coordinate system 950 included in controller 103. In this manner, measurements 801-1a,b and 801-2a,b may always be referred to a unique coordinate system 950, leaving no ambiguity for the location and orientation of target-transmitter 102. In some embodiments, coordinate system 950 may be included in one of receivers 801, so all other receivers 801 may be referred to system 950. Furthermore, some embodiments may be such that receiver 801-2 and any other receiver 801 that may be present is referred to system A in receiver 801-1. Thus, receiver 801-1 may be referred to system 950 included in controller 103 to provide a universal frame of reference.

Thus, in some embodiments one of spar receivers 801 may know its exact geophysical location and orientation (by communicating with controller 103 or using a GPS system) and act as the central processor in order to do the modeling required to locate target 102 as in method 700 (cf. FIG. 7).

Figure 10:
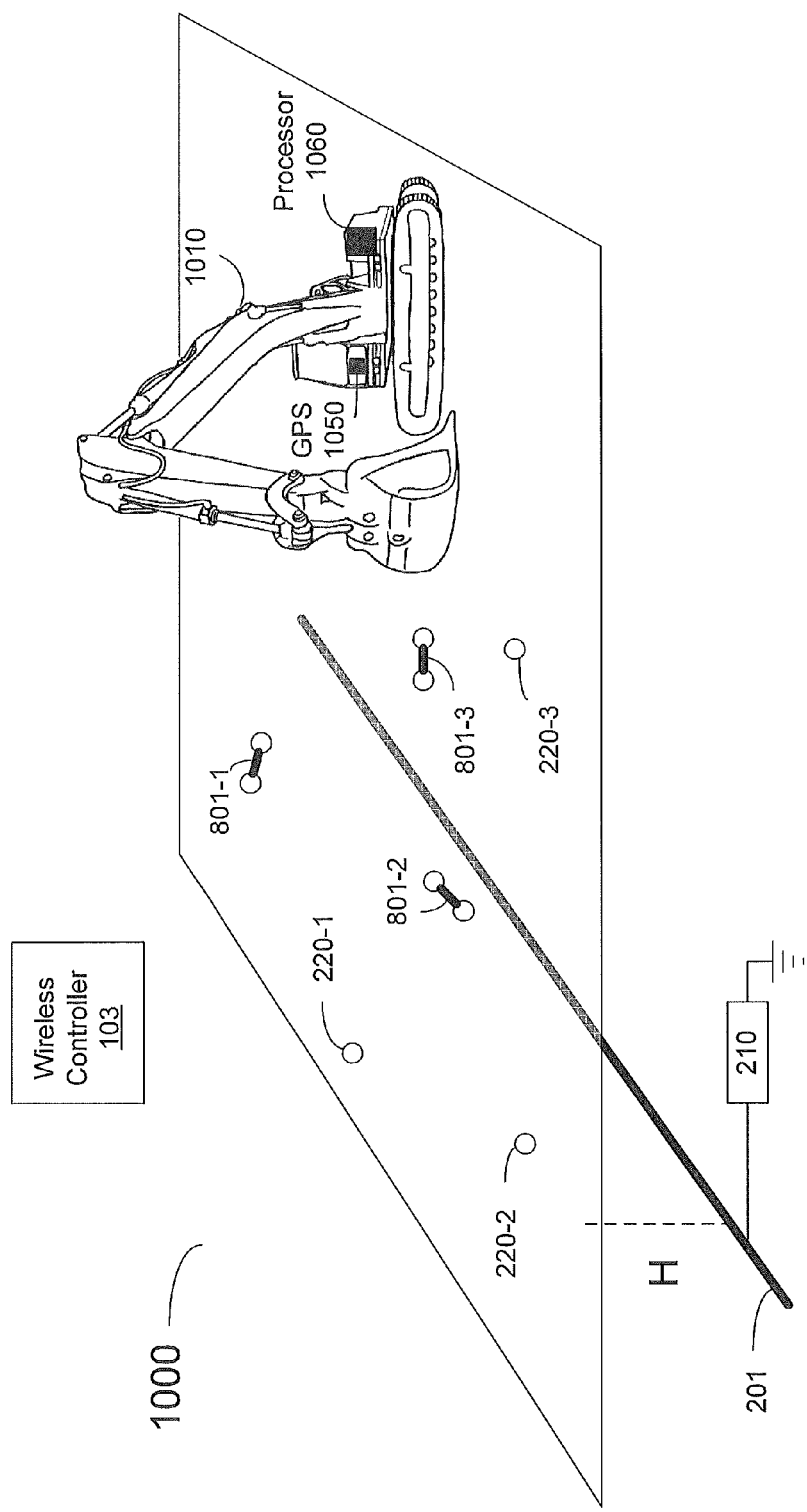
FIG. 10 illustrates a configuration for a controller-based precise location tracking system including construction equipment having a positioning system and a processor, according to some embodiments.

FIG. 10 illustrates a controller-based precise location tracking system 1000 including construction equipment 1010 having positioning system 1050 and processor 1060, according to some embodiments. Tracking system 1000 may also include a sensor network having a plurality of single point receivers (locators) 220-1, 220-2, and 220-3, a plurality of spar receivers 801-1, 801-2, and 801-3, controller 103, and transmitter 210 coupled to underground power line 201. While machine 1010 may be conducting operations in the surface, power line 201 may be dangerously close to the blade of the machine. In some embodiments, line 201 may be any type of conducting line, such as a water or gas pipeline, a drainage system, a plumbing line, or other.

In embodiments consistent with FIG. 10, tracking system 1000 may provide information to the operator of machine 1010 about the precise location of conducting line 201 relative to machine 1010, and its blade. According to FIG. 10, the sensor network including receivers 101, 220 and 801, transmitter 210, conducting line 201, and controller 103 may operate as described in detail with reference to method 700 in FIG. 7. Spar receivers 801-1 through 801-3 may also operate as described with reference to FIG. 9. Thus, controller 103 may provide a precise location of conducting line 201 to processor 1060 in machine 1010. Processor 1060 may further receive a precise indication of the position of machine 1010, for example via a GPS device within machine 1010. Moreover, having a precise position of machine 1010, processor 1060 may determine the location of each of the components in machine 1010 relative to conducting line 201. For example, by having detailed information of the configuration of machine 1010, processor 1060 may determine the relative position of each component in the arms of the shovel in machine 1010. In some embodiments, information of the configuration of machine 1010 may include the state of the hydraulic system controls in the machine.

A configuration such as illustrated in FIG. 10 may substantially reduce the risk for contractors of producing unintended catastrophic damage to public facilities at construction sites. This may be highly desirable for contractors doing heavyduty construction work in public places, especially given the nature of the liabilities involving this type of work.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A method for determining the location and orientation of a transmitter object, the method comprising:
    distributing a plurality of receivers within a space, each of the plurality of receivers being structurally independent from each other and being positioned within the space in a relation with one another that can change each time the plurality of receivers is distributed, each of the plurality of receivers including one or more antennas and electronics for measuring electromagnetic field strength and phase values from the antennas and wirelessly transmitting data, each of the plurality of receivers being in wireless communication with a controller;
    receiving the electromagnetic field strength magnitude and phase values within the space from the plurality of receivers;
    modeling a set of expected complex electromagnetic strengths corresponding to a currently estimated position and orientation of the transmitter object relative to each of the plurality of receivers, the set of expected electromagnetic field values corresponding to a model of the transmitter object position in relation to the positions and orientation of each of the plurality of receivers; and
    estimating parameters related to the transmitter object position based on a residual error between the measured set of complex electromagnetic field values and the set of expected electromagnetic field values.

2. The method of claim 1, wherein the parameters related to the transmitter object include:
    a position of the transmitter object relative to the plurality of receivers;
    an off-axis yaw angle of the transmitter object from a reference direction relative to one or more of the plurality of receivers; and
    a pitch angle of the transmitter object relative to one or more of the plurality of receivers.

3. The method of claim 1 wherein a physical model is used to track the position and orientation of the transmitter object as it moves through a space.

4. A method for determining the location and orientation of a transmitter object, the method comprising:
    distributing a plurality of receivers within a limited space comprising the transmitter object, the plurality of receivers being structurally independent from all others of the plurality of receivers and located within the space in a relation with one another that can change each time the plurality of receivers is distributed, each of the plurality of receivers including one or more antennas and electronics for measuring electromagnetic field strength and phase values from the antennas and wirelessly transmitting data, each of the plurality of receivers being in wireless communication with a controller;
    determining receiver position data, the receiver position data indicating the position and orientation of each of the plurality of receivers within the limited space comprising the transmitter object;
    measuring a set of complex electromagnetic field magnitude and phase strengths with at least one of the plurality of receivers;
    modeling a set of expected complex electromagnetic strengths at a currently estimated position and orientation of the transmitter object, the set of expected electromagnetic field values corresponding to a model of the transmitter object position in relation to the position and orientation of the at least one of the plurality of receivers; and
    estimating parameters related to the transmitter object position based on a residual error between the measured set of complex electromagnetic field values and the set of expected electromagnetic field values.

5. The method of claim 4 wherein each of the plurality of receivers comprises a 3-axis magnetic dipole receiver.

6. The method of claim 4 wherein each of the plurality of receivers comprises a dual 3-axis spar receiver.

7. The method of claim 4 further comprising:
    providing the estimated parameters related to the transmitter object to a machine in the vicinity of the transmitter object and the plurality of receivers, the machine comprising moving parts, a connection to a GNSS, and a processor to precisely position each part of the machine with respect to the transmitter object, the machine capable of performing work.

8. A sensor network comprising a controller and a plurality of receivers; the receivers each comprising one or more coil detectors to receive RF signals from an RF source; the one or more coil detectors for each receiver having mutually orthogonal axes; and further wherein:
    the plurality of receivers are structurally independent and distributable within a space in a relation with one another that can change each time the plurality of receivers is distributed, each of the plurality of receivers including electronics for measuring electromagnetic field strength and phase values from the one or more coil detectors and a transmitter for wirelessly transmitting data,
    the plurality of receivers provide information to the controller to locate the source of the RF signals, the information including position and orientation information of each of the plurality of receivers; and
    the receivers communicate with the controller and optionally with each other using a wireless channel.

9. The sensor network of claim 8 wherein the controller is configured to track the location of the source of the RF signals, further wherein the source of the RF signals comprises one or more sonde transmitters and one or more linear utility lines, each of the one or more sonde transmitters and the one or more linear utility lines producing a known RF signal.

10. The sensor network of claim 8 wherein a 3-dimensional separation between each of the receivers in the sensor network is determined using an RTK-GPS measurement, with one receiver acting as a GNSS base to all the others in the network.

11. The sensor network of claim 8 wherein each receiver can act as a wireless controller and further wherein:
    real-time information available from each receiver in the network includes an offset, depth, range, and orientation of the transmitter object.

12. The sensor network of claim 8 wherein each receiver is connected to a GNSS to more accurately locate a source of the RF signals.

13. The sensor network of claim 8 wherein a synchronization signal between the controller and the plurality of receivers is carried out using a GNSS network.

14. The sensor network of claim 8 wherein a synchronization signal between the controller and the plurality of receivers comprises synchronization beacons provided by the controller.

15. The sensor network of claim 8 wherein the source of the RF signals comprises a transmitter carried by a person traversing a hazard space, and the receivers are carried by one or more persons forming a rescue team.

16. A receiver to detect RF signals produced by an RF source at a remote location, the receiver comprising:
- a set of mutually orthogonal coil detectors, the coil detectors forming a local coordinate system;
- an orientation sensor to determine the orientation of the local coordinate system relative to an external coordinate system;
- a 3-d position measurement unit to determine the position of the local coordinate system relative to one or more points external to the receiver; and
- a two-way wireless interface to communicate with other devices in a sensor network formed by the receiver, at least one other structurally independent receiver, and a controller, the controller being structurally detached from the receiver, wherein the receiver and the at least one other structurally independent receiver are distributable within a space of the RF source that can be different each time the receiver and the at least one other structurally independent receiver are distributed.

17. The receiver of claim 16 wherein the controller is configured to use the measured RF values and the position provided by the receiver to estimate the location of the RF source.

18. The receiver of claim 16 further comprising a processing unit to compute an estimate of the location of the RF source using the measured RF values, the position provided by the 3-d position measurement unit.

19. The receiver of claim 16 wherein the RF source comprises a plurality of RF transmitters, each transmitter producing an RF signal with a specific code, and the receiver further comprising a processing unit that de-codifies the signal from each of the plurality of RF transmitters.

20. The receiver of claim 16 wherein the 3-d position measurement unit is an RTK-GPS based positioning unit.

\* \* \* \* \*